UNITED STATES PATENT OFFICE.

ALONZO FARRAR, OF BROOKLINE, MASSACHUSETTS.

IMPROVED PROCESS OF TREATING ACID RESIDUUM FROM OIL-REFINERIES.

Specification forming part of Letters Patent No. 100,876, dated March 15, 1870.

*To all persons to whom these presents may come:*

Be it known that I, ALONZO FARRAR, of Brookline, in the county of Norfolk and State of Massachusetts, have made a new and useful invention or process of treating the oil derived from the purification of sulphuric acid after having been used in refining petroleum; and I do hereby declare the same to be described as follows:

On June 14, 1864, Letters Patent of the United States No. 43,157 were granted to myself and Robert G. Loftus for a process of recovering the sulphuric acid used in refining petroleum.

In treating the said acid by the said patented process there is an oily residuum left, which has an odor so offensive as to render it of little or no practical value, the said odor being a bar to its use in the arts.

On October 26, 1869, Letters Patent No. 96,097 were granted to me for a process of utilizing the said residuum, or depriving it of its disagreeable odor, and of improving it in a manner to render it fit for use for several purposes, in the arts especially, in the making of liquid paint and printer's ink.

It has been found, however, that this process would not always operate to advantage, or only when the spent acid is fresh, for after standing a week or ten days a chemical change takes place in it which prevents the process from deodorizing the residuum. I have therefore discovered a new process of treating the residuum, which answers as well when the spent acid is fresh, or after it may have been changed, as mentioned. In my new process I make no use of lime and water, as in the patented process.

In carrying out the new process I proceed as follows: A quantity of the residuum, say, one hundred gallons, is to be put into a still or open kettle, and heat applied to the same, so as to distill off the light oil and reduce the residuum to the necessary consistency. Generally speaking, from twenty-five to fifty per cent. of the light oil is thus to be removed. The balance is next to be put into an agitator or vessel provided with a means of agitating and keeping in agitation any liquid matter which may be put into such vessel. In this vessel the residuum is to be heated by means of steam or heat, properly applied, and should be raised to a temperature of from 180° to 212° Fahrenheit. Next, there should be added to the material so heated a quantity of chlorine or chloride of lime—that is, about one pound of the chloride to ten gallons of the material, after which the agitation of the mixture should take place, and the heat be kept up for from thirty minutes to an hour, or until the desired effect may be produced. Next, the mixture should be allowed to stand and deposit its impurities or heavier matters. The liquid oil being separated from such deposit will be found to be sufficiently deodorized to render it useful for the making of printer's ink, or for various other purposes in the arts.

From the above it will be seen that the new process involves a distillation of the lighter oils by heat, an incorporation of chlorine or chloride of lime with the residuum, and a subsequent heating and agitating of it until the desired effect results.

I therefore claim as my invention or discovery—

The new process, hereinbefore described, for treating the oily residuum obtained in the purification of the spent acid above mentioned.

ALONZO FARRAR.

Witnesses:
R. H. EDDY,
J. R. SNOW.